US011958210B2

(12) United States Patent
Choi et al.

(10) Patent No.: US 11,958,210 B2
(45) Date of Patent: Apr. 16, 2024

(54) WOOD PREFORMING DEVICE FOR MANUFACTURING CRASH PAD FOR VEHICLE INCLUDING REAL WOOD SHEET

(71) Applicants: HYUNDAI MOBIS Co., Ltd., Seoul (KR); INTOPS CO., LTD., Anyang-si (KR); SEOYON AUTOVISION Co., Ltd., Dangjin-si (KR)

(72) Inventors: Ik Keun Choi, Yongin-si (KR); Min Kyeong Lee, Yongin-si (KR); Hyun Ho Lee, Gunpo-si (KR); Ji Seung Hong, Hwaseong-si (KR); Jong Jin Lee, Incheon (KR)

(73) Assignees: Hyundai Mobis Co., Ltd., Seoul (KR); Intops Co., Ltd., Anyang-si (KR); Seoyon Autovision Co., Ltd., Dangjin-si (KR)

( * ) Notice: Subject to any disclaimer, the term of this patent is extended or adjusted under 35 U.S.C. 154(b) by 9 days.

(21) Appl. No.: 17/842,142

(22) Filed: Jun. 16, 2022

(65) Prior Publication Data

US 2023/0044171 A1 Feb. 9, 2023

(30) Foreign Application Priority Data

Aug. 4, 2021 (KR) ........................ 10-2021-0102384

(51) Int. Cl.
*B27N 3/18* (2006.01)
*B27N 3/20* (2006.01)
*B27M 3/00* (2006.01)

(52) U.S. Cl.
CPC ................. *B27N 3/18* (2013.01); *B27N 3/20* (2013.01); *B27M 3/0066* (2013.01)

(58) Field of Classification Search
CPC .. B27M 1/02; B27M 1/04; B27M 3/00; B27C 5/00; B27D 3/00; B27D 1/04; B27D 1/08; B27D 1/083; B27D 1/10; B27D 5/006
See application file for complete search history.

(56) References Cited

U.S. PATENT DOCUMENTS 5,324,384 A 6/1994 Spengler
5,813,137 A * 9/1998 Townsend ................ B27F 1/02 248/346.02

(Continued)

FOREIGN PATENT DOCUMENTS

CN 101310944 A 11/2008
CN 101380754 A 3/2009

(Continued)

*Primary Examiner* — Matthew Katcoff
(74) *Attorney, Agent, or Firm* — NSIP Law

(57) ABSTRACT

Disclosed are wood preforming devices for manufacturing a crash pad for a vehicle including a real wood sheet. A wood preforming device for manufacturing a crash pad for a vehicle includes a real wood sheet includes a lower press mold comprising a debossed portion provided on a portion on which a product is formed, and a support portion configured to support an upper press mold, in response to the lower press mold and the upper press mold pressing each other, the support portion having a protrusion for fixing a real wood sheet, the upper press mold having an embossed portion corresponding to the debossed portion of the lower press mold, and a movable core provided on the debossed portion of the lower press mold and being configured to guide the real wood sheet by moving upward from the debossed portion, in response to the upper press mold moving downward.

9 Claims, 7 Drawing Sheets

(56) References Cited

U.S. PATENT DOCUMENTS

| | | | | |
|---|---|---|---|---|
| 8,747,600 | B2 * | 6/2014 | Omote | B32B 1/00 156/224 |
| 9,248,367 | B2 * | 2/2016 | Imbrie | A63C 17/002 |
| 11,232,770 | B1 * | 1/2022 | Katzenberger | G10D 1/08 |
| 2011/0232823 | A1 | 9/2011 | Dubinskas | |
| 2013/0243983 | A1 | 9/2013 | Omote et al. | |
| 2023/0202705 | A1 * | 6/2023 | Querol Puig | B65D 5/4266 229/191 |

FOREIGN PATENT DOCUMENTS

| | | | |
|---|---|---|---|
| CN | 102271883 | A | 12/2011 |
| CN | 203543114 | U | 4/2014 |
| CN | 103862680 | A | 6/2014 |
| CN | 111788057 | A | 10/2020 |
| CN | 111976238 | A | 11/2020 |
| CN | 112873464 | A | 6/2021 |
| FR | 2 744 947 | A1 | 8/1997 |
| JP | 2006-68957 | A | 3/2006 |
| JP | 2006-326922 | A | 12/2006 |
| KR | 10-2020-0042116 | A | 4/2020 |

* cited by examiner

WOOD PREFORMING DEVICE FOR MANUFACTURING CRASH PAD FOR VEHICLE INCLUDING REAL WOOD SHEET

CROSS-REFERENCE TO RELATED APPLICATIONS

This application claims the benefit under 35 USC § 119(a) of Korean Patent Application No. 10-2021-0102384, filed on Aug. 4, 2021, in the Korean Intellectual Property Office, the entire disclosure of which is incorporated herein by reference for all purposes.

BACKGROUND

1. Field

The present disclosure relates to real wood skin for automatic wrapping, and a process and apparatus for manufacturing the same.

2. Description of Related Art

Real wood skin applied to a vehicle in the related art is made by preforming a real wood sheet on deco-veneer wood and then performing insert-injection molding (back injection).

Thereafter, trimming is performed on an end of the injection-molded real wood sheet, and then curling and coating are sequentially performed on the real wood sheet, thereby manufacturing the real wood skin.

The real wood skin product in the related art, which is made by applying the back insert-injection molding process, may provide real wood having a visually and tactilely excellent surface. However, because the real wood having high hardness is attached to the injection-molded part, the real wood provides cheeping feeling to a customer when the customer pushes the real wood.

Of course, some customers may think that it is natural for the real wood to have high hardness. However, a customer, who needs soft interior materials, cannot be satisfied with the real wood.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a wood preforming device for manufacturing a crash pad comprising a real wood sheet for a vehicle, the device including a lower press mold comprising a debossed portion provided on a portion on which a product is to be formed, and a support portion configured to support an upper press mold, in response to the lower press mold and the upper press mold pressing each other, the support portion having a protrusion for fixing a real wood sheet, the upper press mold having an embossed portion corresponding to the debossed portion of the lower press mold, and a movable core provided on the debossed portion of the lower press mold and being configured to guide the real wood sheet by moving upward from the debossed portion, in response to the upper press mold moving downward.

A position of the protrusion may be based on an elongation percentage of the real wood sheet at an edge portion of the real wood sheet when the real wood sheet is compressed.

The device may include a fixing hole machining pin configured to form a fixing hole in a fixing rib portion of the real wood sheet by protruding, in response to the embossed portion of the upper press mold and the debossed portion of the lower press mold pressing each other.

The fixing hole machining pin may form the fixing hole in the fixing rib portion of the real wood sheet by protruding in response to a fixing pin provided on the lower press mold being pressed by the upper press mold.

In another general aspect, here is provided a method of manufacturing a real wood sheet for wrapping a crash pad, the method including forming a real wood sheet main body part by cutting a raw real wood sheet in a shape of a real wood product, forming a plurality of wood sheet compression fixing rib portions, each having a first length formed by cutting the raw real wood sheet, at an outer periphery of the real wood sheet main body part to fix the real wood sheet during a preforming process, and forming a plurality of wrapping fixing rib portions, each having a second length formed by cutting the raw real wood sheet, at the outer periphery of the real wood sheet main body part to fix the real wood sheet during a compression process.

In another general aspect, here is provided a method of manufacturing a real wood sheet for wrapping a crash pad, the method including forming a real wood sheet main body part by forming a raw real wood sheet in a shape of a real wood product, forming a plurality of wood sheet compression fixing rib portions at an outer periphery of the real wood sheet main body part to fix the real wood sheet main body part to a preforming press during a preforming process, and forming a plurality of wrapping fixing rib portions at the outer periphery of the real wood sheet main body part to fix the real wood sheet main body part to a compression press during a compression process.

The plurality of wood sheet compression fixing rib portions may be formed on the raw real wood sheet using a forming device.

The method may include forming first fixing holes in the compressing fixing rib portion to fix the first fixing holes to fixing pins of the preforming press during the preforming process.

The first fixing hole may include a slit groove.

The method may include forming second fixing holes in the plurality of wrapping fixing rib portions using hole machining pins of the preforming press during a preforming fixing process to fix the real wood sheet to pins of a press forming device during a wood press process.

The forming device may include a cutter.

In another general aspect, here is provided a processor-implemented method of manufacturing a real wood sheet for wrapping a crash pad, the method including preparing a lower press mold and an upper press mold, seating and fixing a real wood sheet on first fixing holes of the lower press mold, moving the upper press mold downward, moving a movable core provided on the lower press mold upwards to guide the real wood sheet, in response to the upper press mold moving downward, and pressing the upper press mold against the lower press mold for a preforming process on the real wood sheet.

The pressing of the lower press mold and the upper press mold may include forming second fixing holes in wrapping fixing rib portions provided on the real wood sheet using hole machining pins provided on the lower press mold.

Other features and aspects will be apparent from the following detailed description, the drawings, and the claims.

Figure 1:
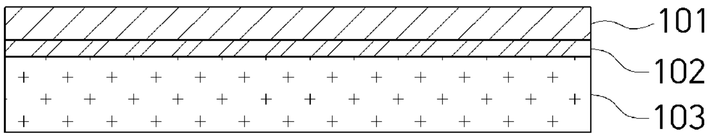
FIG. 1 is a reference view for explaining real wood skin according to the present disclosure which may be used for automatic wrapping.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a reference view for explaining real wood skin according to the present disclosure which may be used for automatic wrapping.

As illustrated in FIG. 1, real wood skin according to a first embodiment of the present disclosure, which may be used for automatic wrapping, includes a wood layer 101, a mesh layer 102, and a flexible layer 103.

The wood layer 101 is a layer that provides the same visual feeling as a wooden material. The wood layer 101 may have a thickness of 0.1 t to 0.2 t and may have a grain of wood made by a shading machine.

Further, the mesh layer 102 is a layer stacked on a lower portion of the wood layer 101 and configured to reinforce a sheet. The mesh layer 102 may have a thickness of 0.2 t.

In addition, the flexible layer 103 is a layer stacked on a lower portion of the mesh layer 102 and configured to provide flexibility. The flexible layer 103 may be made of one of polypropylene (PP) foam and thermoplastic polyolefin (TPO) foam. Further, the flexible layer 103 may have a thickness of 1 t to 2 t.

In addition, according to the first embodiment of the present disclosure, the real wood skin may further include a protective film 104 stacked on an upper portion of the wood layer 101 and configured to protect the wood layer. The protective film 104 may have a thickness of 0.1 t.

Figure 2A:
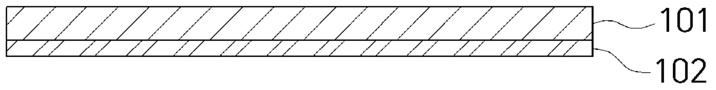
FIGS. 2A to 2C are reference views for explaining a process of manufacturing a crash pad for a vehicle including a real wood sheet according to an embodiment of the present disclosure.
Figure 2B:
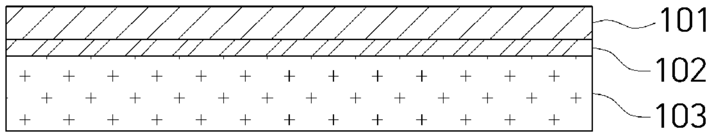
Figure 2C:
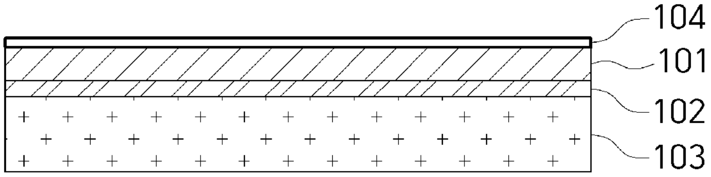

FIGS. 2A to 2C are reference views for explaining a process of manufacturing a real wood sheet according to the first embodiment of the present disclosure.

As illustrated in FIG. 2A, in the real wood sheet according to the first embodiment of the present disclosure, the mesh layer 102 is stacked on a lower end of the wood layer 101. Thereafter, as illustrated in FIG. 2B, the flexible layer 103 is stacked on a lower end of the mesh layer 102. Further, as illustrated in FIG. 2C, the protective film 104 may be stacked on an upper end of the wood layer 101 and protect the wood layer 101.

Figure 3:
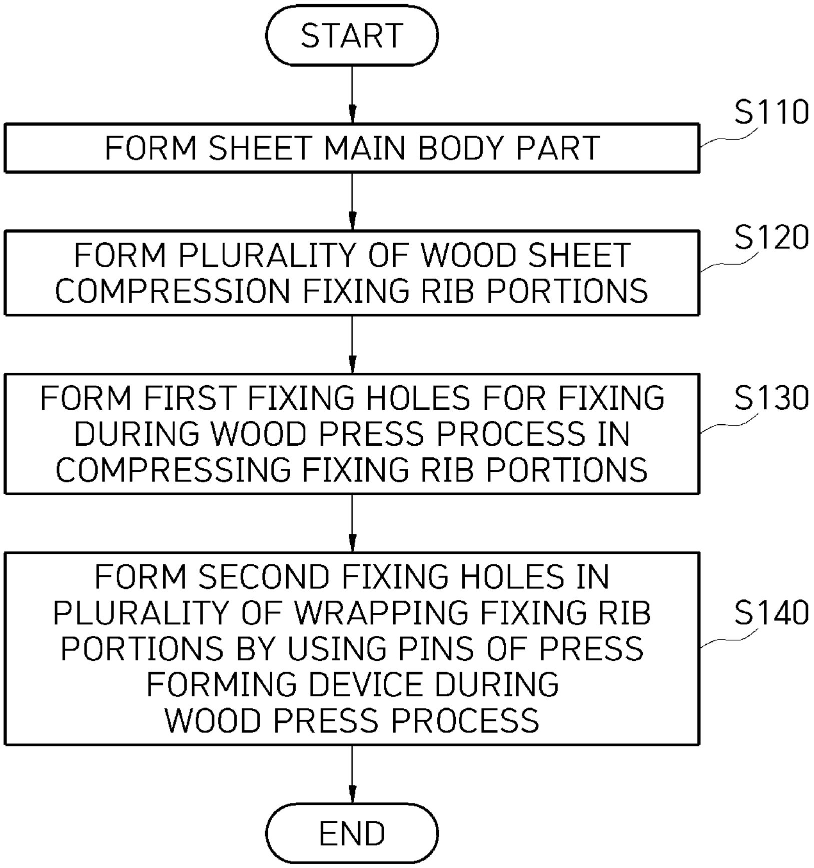
FIG. 3 is a flowchart for explaining a method of manufacturing a real wood sheet using a wood preforming device for manufacturing a crash pad for a vehicle including a real wood sheet according to a first embodiment of the present disclosure.

A method of manufacturing a real wood sheet for wrapping a crash pad according to the first embodiment of the present disclosure will be described with reference to FIG. 3.

Figure 4:
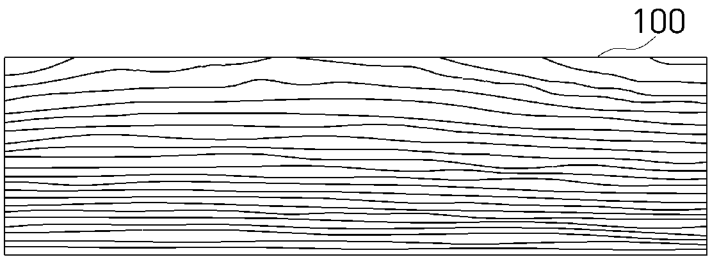
FIG. 4 is a reference view for explaining a raw real wood sheet according to the first embodiment of the present disclosure.
Figure 5:
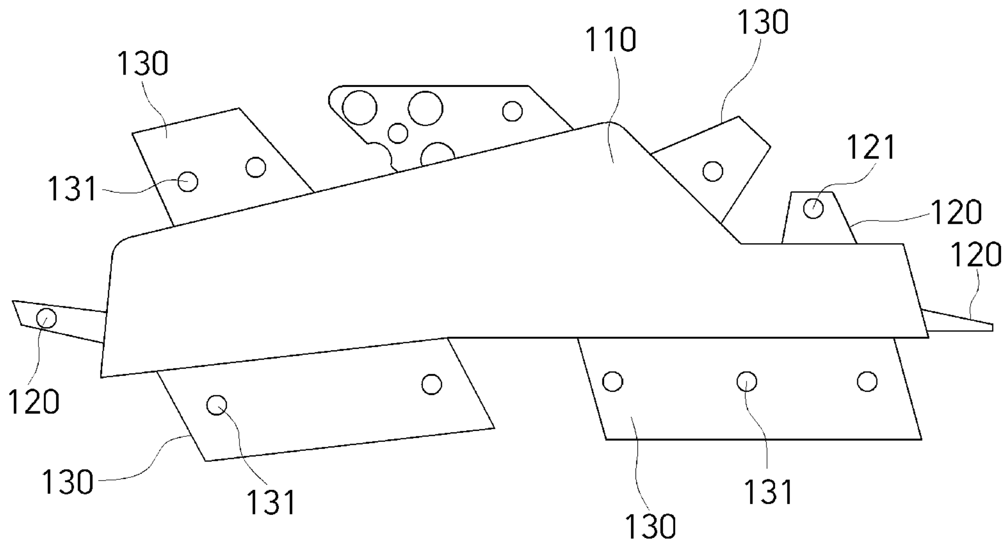
FIG. 5 is a reference view for explaining a real wood sheet for wrapping produced by using the raw real wood sheet according to the first embodiment of the present disclosure.
Figure 6:
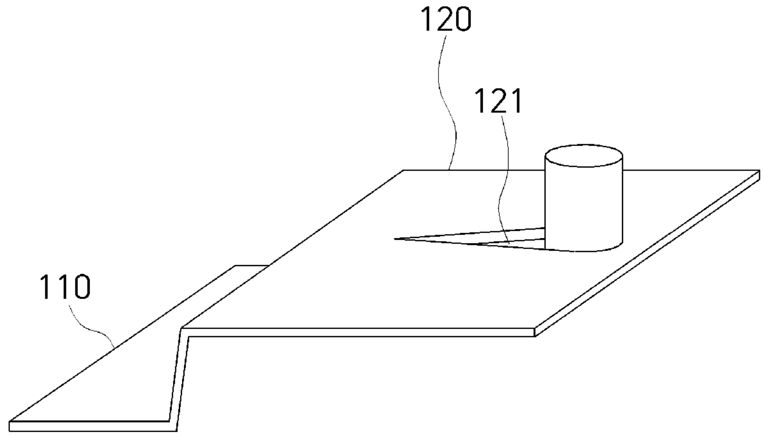
FIG. 6 is a reference view for explaining an operational example of a first fixing hole during a preforming process according to the first embodiment of the present disclosure.

To this end, a real wood sheet 100 manufactured by the above-mentioned method of manufacturing a real wood sheet is formed to have the same shape as a real wood product, as illustrated in FIG. 4. Then, a real wood sheet main body part 110 is manufactured (S110), as illustrated in FIG. 5. In this case, the real wood sheet main body part 110 may have the same shape as a part of a dashboard mounted in a vehicle. The real wood sheet main body part 110 may have the same shape as a core for supporting the real wood sheet.

Thereafter, a plurality of wood sheet compression fixing rib portions 120 and a plurality of wrapping fixing rib portions 130 are formed at an outer periphery of the real wood sheet main body part 110 in order to fixing the real wood sheet 100 to a preforming press or compression press during the process (S120). The plurality of wood sheet compression fixing rib portions 120 may be formed on the raw real wood sheet by using a forming device (cutter).

First fixing holes 121 are formed in the compressing fixing rib portions 120 so as to be fixed to fixing pins of the preforming press during the preforming process (S130).

The first fixing holes 121, which are formed as described above, are fixed to the fixing pins of the press during the preforming process. Meanwhile, as illustrated in FIG. 7, the first fixing hole 121 may further have a slit groove 122.

Figure 8:
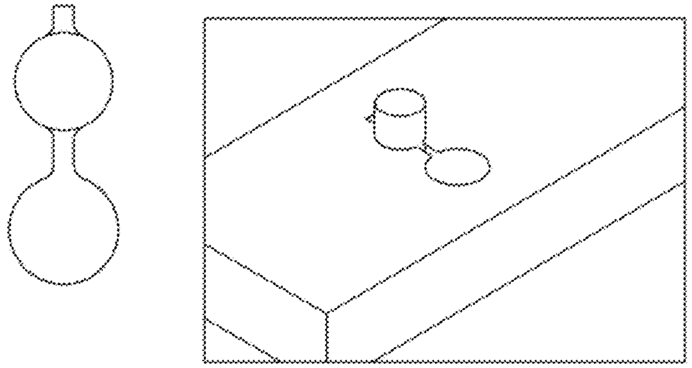

Therefore, when the upper press mold and the lower press mold press each other for preforming, the fixing pin of the preforming press may move along the slit groove 122 in the first fixing hole 121, as illustrated in FIG. 8, thereby preventing damage to the real wood sheet main body part 110.

Figure 7:
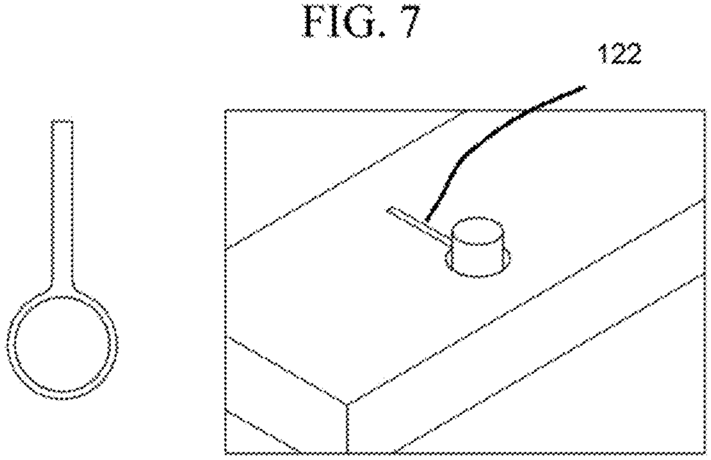
FIGS. 7 and 8 are reference views for explaining a slit groove formed in the first fixing hole according to the first embodiment of the present disclosure.

That is, when the preforming process is performed on the real wood sheet 100 in the state in which the first fixing holes 121 of the real wood sheet 100 are fixed to the fixing pins of the preforming press, the first fixing holes 121 may be expanded, as illustrated in FIG. 7. Therefore, during the preforming, it is possible to complete the preforming process on the real wood sheet while preventing damage that may occur when the real wood sheet main body part 110 is fixed.

Thereafter, during the wood press process, a hole machining pin of a preforming press is used to form second fixing holes 131 in the plurality of wrapping fixing rib portions 130 during a preforming fixing process in order to fix the real wood sheet to pins of a press forming device (S140).

Meanwhile, positions at which the first fixing holes 121 are formed in the compressing fixing rib portion 120 may be defined depending on an elongation percentage of the real wood.

Figure 9:
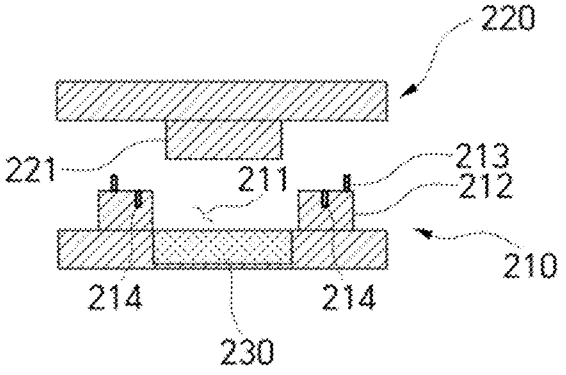
FIG. 9 is a process flowchart for explaining a wood preforming device for manufacturing a crash pad for a vehicle including a real wood sheet according to a fourth embodiment of the present disclosure.

FIG. 9 is a view for explaining a wood preforming device for manufacturing a crash pad for a vehicle including a real wood sheet according to a fourth embodiment of the present disclosure.

As illustrated in FIG. 9, the wood preforming device for manufacturing a crash pad for a vehicle including a real wood sheet according to the fourth embodiment of the present disclosure includes a lower press mold 210, an upper press mold 220, and a movable core 230.

The lower press mold 210 includes: a debossed portion 211 formed in a portion on which a real wood sheet product is mounted and formed; and a support portion 212 configured to support the upper press mold 220 when the upper press mold and the lower press mold press each other. The lower press mold 210 includes fixing pins 213 configured to fix the real wood sheet 100 to the support portion 212.

The upper press mold 220 includes an embossed portion 221 corresponding to the debossed portion 211 of the lower press mold 210.

The movable core 230 is provided on the debossed portion 211 of the lower press mold 210. The movable core 230 guides the real wood sheet 100 while moving upward from the debossed portion 211 and then moving downward when the upper press mold 220 moves downward.

Meanwhile, the fixing pins 213 may be provided at positions set depending on an elongation percentage of the sheet calculated in respect to an edge portion of the real wood sheet 100 when the real wood sheet 100 is compressed.

Further, the lower press mold 210 may further include hole machining pins 214 configured to form the fixing holes in the wrapping fixing rib portions 130 of the real wood sheet 100 by protruding when the embossed portion 221 of the upper press mold 220 and the debossed portion 211 of the lower press mold 210 press each other.

The hole machining pins 214 may also form the second fixing holes 131 in the wrapping fixing rib portions 130 of the real wood sheet 100 by protruding when the fixing pins 213 provided on the lower press mold 210 are pressed by the upper press mold 220.

Figure 10A:
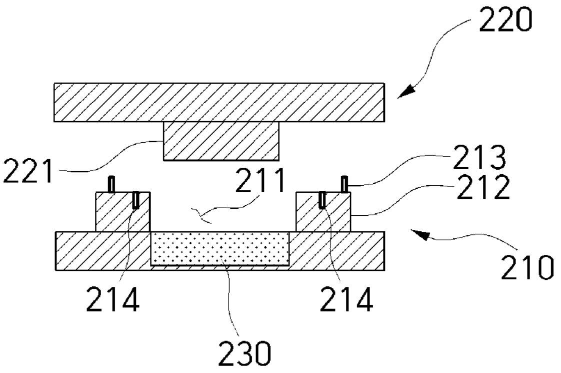
FIGS. 10A to 10D are reference views for explaining a process of operating a lower press mold and an upper press mold according to the fourth embodiment of the present disclosure.

As illustrated in FIG. 10A, the fourth embodiment of the present disclosure includes the lower press mold 210 and the upper press mold 220.

Figure 10B:
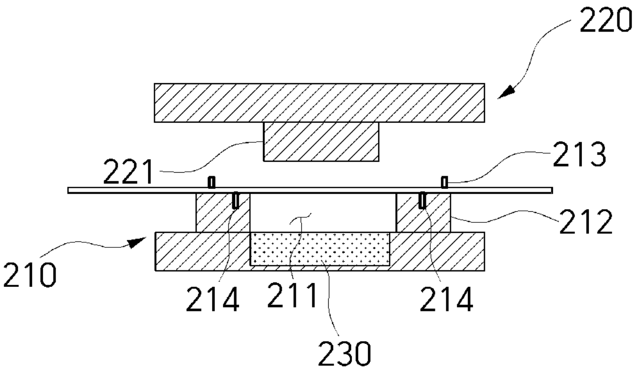
Figure 10C:
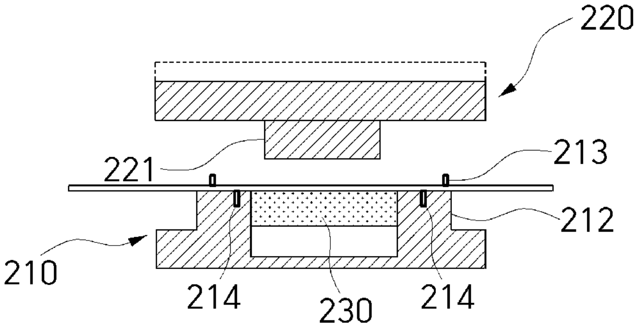

Thereafter, as illustrated in FIG. 10B, the real wood sheet 100 is seated on the first fixing holes 213 of the lower press mold 210.

In this state, the upper press mold 100 moves downward. In this case, as illustrated in FIG. 100, the movable core 230 provided on the lower press mold 210 guides the real wood sheet 100 while moving upward when the upper press mold 100 moves downward.

Figure 10D:
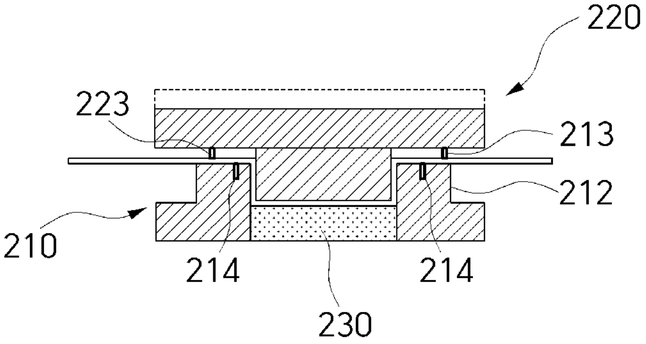

Thereafter, as illustrated in FIG. 10D, the preforming process on the real wood sheet 100 is completed as the upper press mold 220 is pressed against the lower press mold 210.

Meanwhile, as illustrated in FIG. 10D, the second fixing holes 131 are formed in the wrapping fixing rib portions 130 of the real wood sheet 100 by the hole machining pins 214 provided on the lower press mold 210 during the process in which the lower press mold 210 and the upper press mold 220 press each other.

As described above, according to the fourth embodiment of the present disclosure, the fixing holes required for the step of forming the real wood sheet may be automatically formed during the preforming process. Therefore, it is possible to reduce the total number of additional processes while preventing the positions of the fixing holes from being changed by the preforming process.

That is, it is possible to solve the problem in that the positions of the fixing holes are changed as the real wood sheet is compressed by the press device in the preforming process step when the fixing holes required for the compression process are formed during an initial preforming process.

Each step included in the method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

The present disclosure has been made in an effort to solve the problems in the related art, and an object of the present disclosure is to provide a real wood sheet capable of visually providing a real wood feeling, a crash pad for a vehicle capable of providing flexibility by using the real wood sheet, and a press device for manufacturing a crash pad for a vehicle.

The present disclosure has also been made in an effort to provide a real wood sheet capable of being used for wrapping during a process of manufacturing a crash pad for a vehicle, and a press device capable of manufacturing a crash pad for a vehicle using the real wood sheet.

The present disclosure makes it possible to provide a real wood sheet for a desk for a vehicle that visually provides the same feeling as real wood.

In an example, the fixing holes for the step of forming the real wood sheet may be automatically formed during the preforming process. Therefore, it is possible to reduce the total number of additional processes while preventing the positions of the fixing holes from being changed by the preforming process.

In an example, it is possible to prevent the real wood sheet from being damaged by the press which is pressed during the process of compressing the real wood sheet or the preforming process.

In an example, the steam module may first perform the process of heating the real wood sheet by spraying heated steam to the real wood sheet before the upper press mold and the lower press mold press each other.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of manufacturing a real wood sheet for wrapping a crash pad, the method comprising:

forming a real wood sheet main body part by cutting a raw real wood sheet in a shape of a real wood product;

forming a plurality of wood sheet compression fixing rib portions, each having a first length formed by cutting the raw real wood sheet, at an outer periphery of the real wood sheet main body part to fix the real wood sheet during a preforming process;

forming a plurality of wrapping fixing rib portions, each having a second length formed by cutting the raw real wood sheet, at the outer periphery of the real wood sheet main body part to fix the real wood sheet during a compression process; and aligning the real wood sheet using the compression fixing rib portions and the wood sheet wrapping fixing rib portions in a press mold.

2. A method of manufacturing a real wood sheet for wrapping a crash pad, the method comprising:

forming a real wood sheet main body part by forming a raw real wood sheet in a shape of a real wood product;

forming a plurality of wood sheet compression fixing rib portions at an outer periphery of the real wood sheet main body part to fix the real wood sheet main body part to a preforming press during a preforming process;

forming a plurality of wrapping fixing rib portions at the outer periphery of the real wood sheet main body part to fix the real wood sheet main body part to a compression press during a compression process; and aligning the real wood sheet using the compression fixing rib portions and the wood sheet wrapping fixing rib portions in a press mold.

3. The method of claim 2, wherein the plurality of wood sheet compression fixing rib portions is formed on the raw real wood sheet using a forming device.

4. The method of claim 2, further comprising:

forming first fixing holes in the compressing fixing rib portion to fix the first fixing holes to fixing pins of the preforming press during the preforming process.

5. The method of claim 4, wherein the first fixing hole comprises a slit groove.

6. The method of claim 2, further comprising:

forming second fixing holes in the plurality of wrapping fixing rib portions using hole machining pins of the preforming press during a preforming fixing process to fix the real wood sheet to pins of a press forming device during a wood press process.

7. The method of claim 2, wherein the forming device comprises a cutter.

8. The method of claim 2, wherein the performing process comprises:

preparing a lower press mold and an upper press mold;

seating and fixing a real wood sheet on first fixing holes of the lower press mold;

moving the upper press mold downward;

moving a movable core provided on the lower press mold upwards to guide the real wood sheet, in response to the upper press mold moving downward; and pressing the upper press mold against the lower press mold for a preforming process on the real wood sheet.

9. The method of claim 8, wherein the pressing of the lower press mold and the upper press mold comprises forming second fixing holes in wrapping fixing rib portions provided on the real wood sheet using hole machining pins provided on the lower press mold.

* * * * *